July 7, 1970

P. N. HELLER 3,519,790

METALS JOINING

Filed Dec. 7, 1967

July 7, 1970     P. N. HELLER     3,519,790

METALS JOINING

Filed Dec. 7, 1967     3 Sheets-Sheet 2

United States Patent Office 3,519,790
Patented July 7, 1970

3,519,790
METALS JOINING
Philip N. Heller, Greensburg, Pa., assignor to Westinghouse Electric Corporation, Pittsburgh, Pa., a corporation of Pennsylvania
Filed Dec. 7, 1967, Ser. No. 688,893
Int. Cl. B23k 9/00
U.S. Cl. 219—137    4 Claims

ABSTRACT OF THE DISCLOSURE

A method of welding coil leads 15 of a rotating machine 14 to its commutator risers 11. The risers 11 are separated by mica insulators 17. A resilient, as distinct from a stiff arc, is moved continuously in successive circular paths over the joints between the risers 11 and leads 15 welding the joints. Because the arc is resilient it is not interrupted by the insulating strips 17. Effective grounding 33, 37, 39 for the risers is provided.

BACKGROUND OF THE INVENTION

This invention relates to metals joining and has particular relationship to the metallurgical joining of an array of joints between which electrically insulating strips are interposed. Specifically this invention concerns itself with the metallurgical joining of an array of joints between commutator risers of rotating machines, which are separated by electrically insulating strips, and coil leads to be connected to the risers.

In accordance with the teachings of the prior art this joining is effected by radial-flow solder pots which operate to heat each joint in its turn between a coil lead and a riser and to cause solder to flow along, and solidify in this joint. Because the solder has a relatively low melting temperature this prior art practice is limited to machines whose riser-lead joints are at relatively low temperatures during the anticipated continuous operation of the machines.

For higher-power machines the riser-lead joints are formed by TIG (tungsten-inert-gas) welding. Each joint is indexed into welding relationship with a TIG welding electrode and an arc is fired between the joint and the electrode and moved radially along the joint to produce the weld. In this operation heat is concentrated, during each welding pass, in a narrow radial region and it is necessary to avoid uneven or non-uniform heating of the riser-lead joint near each weld. For this purpose alternate or several successive riser-lead joints are skipped in the indexing into welding position during each cycle and the unwelded joints are thereafter indexed for welding after the welding during successive cycles.

In use this latter prior art practice has required elaborate equipment and has proved time-consuming and costly. A commutator includes a large number of separate risers of small width. Typically the risers are arrayed in an annulus of 10½ inches inside diameter and 13 inches outside diameter. Typically each riser is of generally trapezoidal transverse (perpendicular to axis of commutator) section and has an outer width of 3/16 inch and an inner width of ⅛ inch. The insulating strips are about 40 to 60 mills (thousands of an inch) in width. There are about 130 risers on such a commutator. For each radial welding pass the welding electrode must be set precisely with respect to each riser; this requires a highly complex precision setting apparatus. The welding during succeeding cycles, of the riser-lead joints which were not welded during preceding cycles adds to the demands for precision and, where the operation is to be fully automatic, imposes severe demands on the control computer apparatus.

The arc is in this operation extinguished at the end of each pass and refired at the beginning of the next pass. This together with the indexing is highly time consuming.

It is an object of this invention to overcome the disadvantages and failings of the prior art and to provide a method for welding the joints between an array of sets of electrical conductors and metallic strip means separated by insulating strip means with relatively simple and low-cost apparatus and without excessive consumption of time. Specifically it is an object of this invention to provide a low-cost readily-usuable method, free of high precision demands, of welding commutator risers of a rotating machine to the coil leads of the machine.

SUMMARY OF THE INVENTION

This invention arises from the discovery that with a resilient or flexible arc, as distinct from a stiff arc, the welding may be carried out with a succession of passes perpendicular to, rather than, along the joints. In the welding of commutator risers to coil leads the passes are circumferential rather than radial.

A resilient arc is here defined as an arc which stretches without becoming extinguished as the arc gap lengthens over a reasonable range. Resilience in an arc may be achieved by supplying the arc from an arc-welding power supply which has adequate inductance, either lumped or distributed, to store energy for maintaining the arc and adequate voltage to prevent extinction.

In accordance with this invention a method is provided for welding the joints between an array of conductors and metallic strip means separated by electrical insulator strip means by passing a resilient arc across the array in a direction perpendicular to the joints. The arc passes over and bridges the insulator means between each metallic strip means and the adjacent strip means but does not become extinguished. As the arc passes across the boundary between the metallic strip means and the insulator means and approaches the center of the insulator means, it lengthens. As the arc approaches the next boundary between the insulator means and the next metallic strip means, it passes to this next strip means and continues to burn. It is essential that all of the insulated strip means be effectively connected to the terminal of the arc supply remotest from the welding electrode.

Each cross or circumferential pass of the arc produces a narrow cross or circumferential weld but the heat of this weld passes through the whole mass and is not confined to a few strips adjacent to a joint. Uneven or non-uniform heating is thus avoided. After each cross or circumferential weld is produced the electrode is indexed to produce an adjacent, usually overlapping cross weld. This cross welding and indexing continues until the joints are welded throughout. The electrode need not be precisely set by each indexing operation and high precision apparatus is not necessary. Nor need any regions, which must be later precisely located, be passed over.

In the welding of coil conductors to commutator risers the movement of the arc is circumferential. The welding may be carried out with the welds in concentric, usually overlapping circles or with the welds in a spiral with the turns of the spiral usually overlapping.

BRIEF DESCRIPTION OF THE DRAWINGS

For a better understanding of this invention, both as to its organizations and as to its method of operation, together with additional objects and advantages thereof reference is made to the following description taken in connection wtih the accompanying drawings, in which.

DETAILED DESCRIPTION OF THE INVENTION

Figure 5:
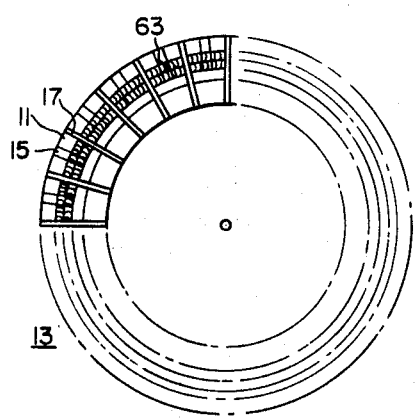
FIG. 5 is a view similar to FIG. 4 showing spiral welding of the lead-riser joints.
Figure 4:
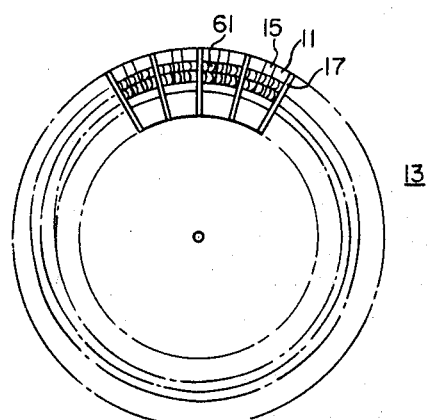
FIG. 4 is a view in end elevation of a commutator riser showing concentric welding of the lead-riser joints.

With the apparatus shown in the drawings welding is carried out of the risers 11 of a commutator 13 of a machine 14, such as a DC motor for example, to the coil leads 15. The risers 11 are separated by insulating strips or segments 17. The welding is carried out by fusion arc welding with a non-consumable electrode; the welding path being either concentrically circular (FIG. 4) or spiral (FIG. 5).

The apparatus includes a tool such as a coil-winding lathe 21 with cross slide 41, or like unit, between whose rotating centers 23 and 25 the machine 14 including its commutator is rotatably mounted. The machine 14 is rotated through a speed-reducer drive 27 by a motor 29 mounted on the support or ways 31 of the lathe 21.

The commutator 13 and the risers 11 are grounded effectively by layers 33 of copper wrapped around the bars 35 and firmly connected to the shaft 37 of the machine 14. The layers are tightly clamped to the bars 35 by clamp 39. The physical ground is clamped to the way 31 of the lathe 14 and the commutator risers 11 are grounded through the ways shaft and centers 23 and 25.

The lathe 21 includes a composite cross-slide carriage 41. This carriage 41 is movable transversely to the axis between the centers 23 and 25 and is moved in this direction by a motor 43 on the support 31 through speed reducer 45. The carriage 41 has a longitudinally movable carriage 47 which may be set by a hand wheel 49.

An electrode holder or torch 51 carrying a non-consumable electrode 53 is secured on the carriage 47 by a clamp 55. The holder 51 includes a cable through which the cooling liquid (water), shielding gas, stabilizing high-frequency current and welding current are supplied. Preferably the shielding gas is helium although argon or other inert gas is usable.

Figure 6:
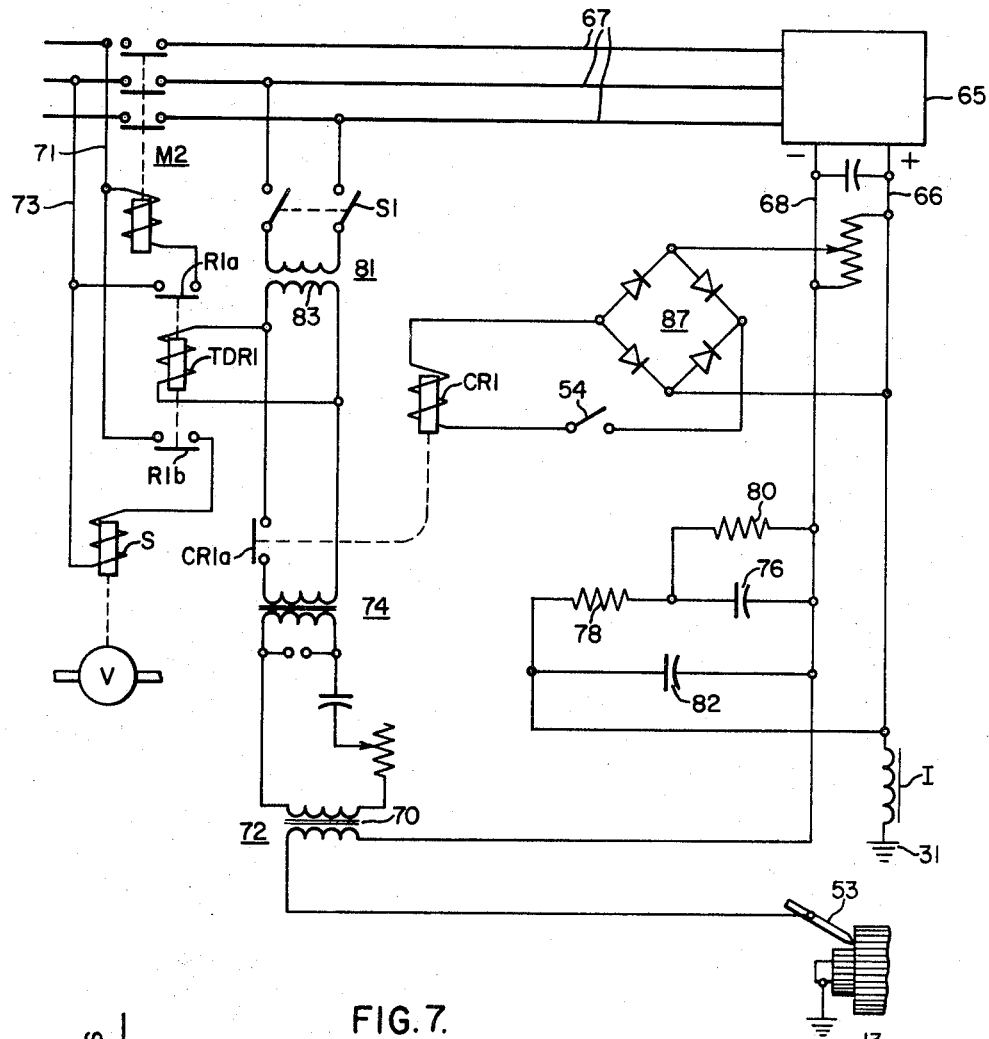
FIG. 6 is a schematic showing the principal electrical features of apparatus for practicing the invention.

The welding is carried out by an arc between the lead-riser joints and the electrode 53 which burns continuously as the commutator is rotated and produces a generally circular weld 61 (FIG. 4) or 63 (FIG. 5). The arc is supplied from a power supply 65 (FIG. 6) which may be of the alternating or direct-current type but is preferably of the direct-current type. Typically a WSH welder made by Westinghouse Electric Corporation and having a capacity of about 500 amperes is usable. This supply 65 is of the silicon-rectifier type and is energized from three-phase conductors 67 connected to a suitable commercial source through a contactor M2. The coil of contactor M2 is connected to be energized through a contact R1a of a relay R1 (coil not shown) in the control panel (not shown) of the welder (or through an intermediate relay energized by R1). The welding may be carried out at straight or reverse polarity but is preferably carried out at straight polarity. The positive terminal 66 of the supply 65 is connected to the ground through an inductive reactance I and the negative terminal 68 of the supply is connected to the electrode 53 through the secondary 70 of the transformer 72 of a high-frequency stabilizer 74. Across the terminals 66 and 68 a high capacitor 76 (2000 microfarads for example) is connected through a low resistor 78 (½ ohm for example). The capacitor 76 is shunted by a resistor 80 or several hundred ohms (500–600).

The electrode 53 is cooled by water (supply not shown). The water flows continuously. The shielding gas for the arc is supplied through a valve V controlled by a solenoid S. The solenoid S is energized through contact R1b of starting relay R1 from a pair of the buses 71 and 73 connected to the conductors 67 through the contactor M2. Actuation of starting relay R1 immediately starts the flow of gas so that there is a pre-flow of gas, to purge the starting position of the arc, before the arc is fired. The contact R1b is shunted by a slow drop-out contact TDR1a of a time delay relay TDR1.

The stabilizer 74 is energized from a pair of the conductors 67 through a transformer 81 and through switch S1 which is closed during operation. The coil of relay TDR1 is energized from the secondary 83 of transformer 81.

The stabilizer is supplied from secondary 83 through the front contact CR1a of relay CR1. The coil of relay CR1 is energized in dependence upon the voltage between the terminals 66 and 68. This coil is energized through a rectifier 87 from a resistor 89 across the terminal 66 and 68.

With contactor M2 actuated the open circuit voltage (75 volts in the case of the WSH) initially appears across resistor 89 so long as there is no arc between electrode 53 and commutator risers 11. Relay CR1 is then actuated and the stabilizer 74 is energized through contact CR1a. The arc is now fired reducing the voltage across resistor 89 to the arc voltage, about 20 volts. The relay CR1 is deenergized deenergizing the stabilizer. The arc continues to burn.

Figure 1:
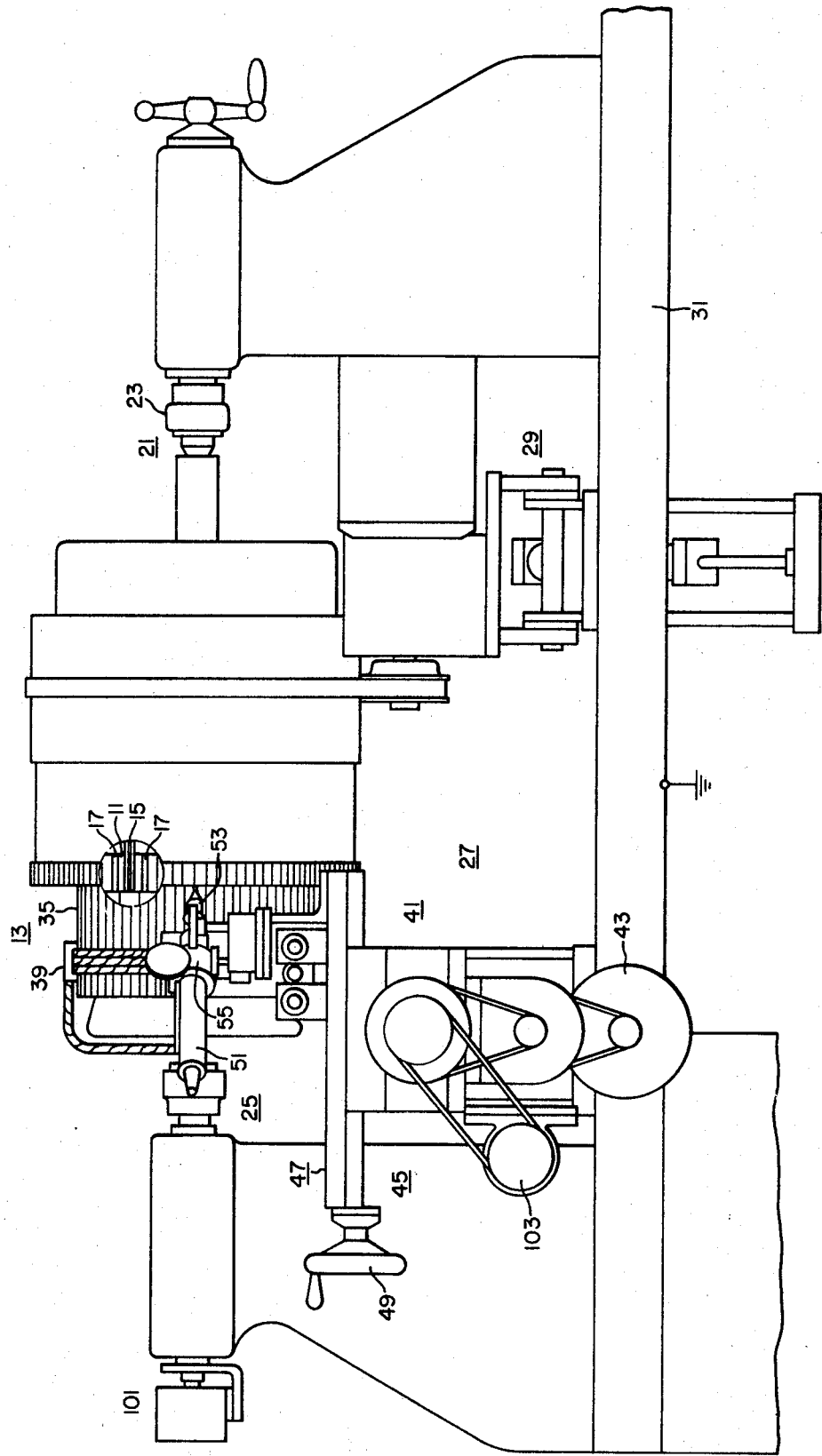
FIG. 1 is a view in side elevation showing apparatus, for practicing this invention.
Figure 2:
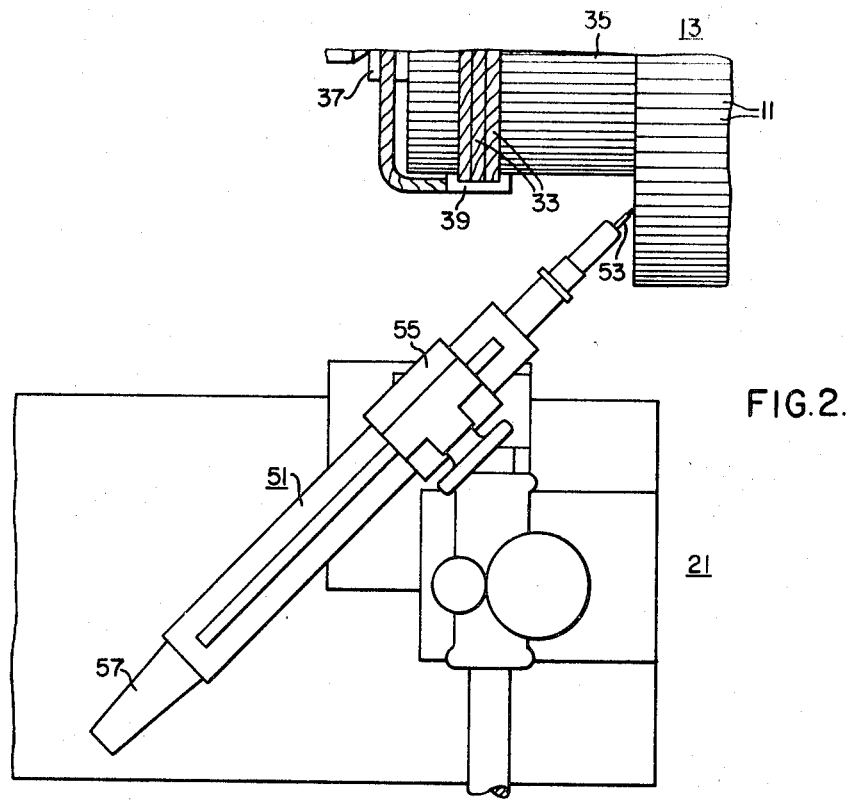
FIG. 2 is a plan view enlarged of the part of the apparatus shown in FIG. 1 including the welding torch or electrode holder.

In the typical automatic practice of this invention the weld or weld beads 61 are concentric or coaxial rather than in a spiral. In this case the electrode is moved radially following each circular weld. This movement is effected by the motor 43 which operates through a magnetic clutch. Typically the circumferential and radial movements are coordinated by counting pulses produced by transducers 101 and 103 (FIG. 1). Transducer 101 produces pulses per degree of rotation of the commutator 13 and counter 103 produces pulses per unit (typically .001 inch per pulse) of radial travel. Typically the apparatus also includes in its control console (not shown) a counter (not shown) for summing the counts of transducer 103 to determine when a complete annulus of lead-risers is welded.

In the practice of this invention the commutator 13 is mounted between centers 23 and 25 and the risers 11 adequately grounded. The motor 43 is then operated by a jog switch (not shown) on the control console (not shown) until the electrode 53 is opposite one of the peripheries, usually the inner periphery, of the commutator-riser array. The wheel 49 is then turned until the electrode 53 is set with the proper spacing from the commutator riser 11 at which the welding is to start. Typically this spacing should be between .025 and .035 inch. The instantaneous start button of the apparatus is then actuated. The counters connected to the transducers 101 and 103 and the summing counter (not shown) are set to zero automatically. Relay R1 is actuated starting the shielding gas flow and producing welding potential between terminals 66 and 68. Relay CR1 is then actuated energizing the stabilizer 74 and firing the arc. Once the arc is fired, relay CR1 drops out deenergizing the stabilizer.

In addition motor 29 is energized rotating the commutator 13. Motor 29 remains energized throughout the welding of a complete annular array.

A capacitor 82 of about ½ microfarad is connected directly across conductors 66 and 68. The reactance I should be adequate to assure that the welding arc is flexible. For the RSH welder typically used the reactance I is about 2.1 millihenries measured at a frequency of 60 cycles per second.

A capacitor of about 4 or 5 microfarads is connected directly across the output terminals. This capacitor prevents the high-frequency stabilizing current from flowing into the supply 65. Motor 43 is also energized and remains energized throughout, but the magnetic clutch (not shown) interposed between it and the carriage 41 is disconnected so that the electrode 53 remains set in the preset radial position.

Figure 3:
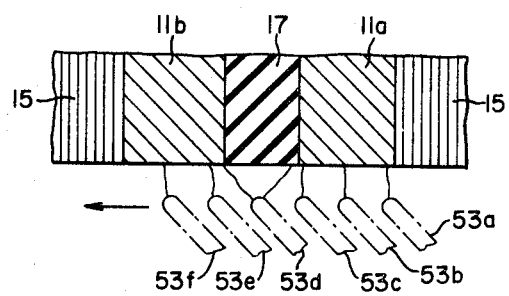
FIG. 3 is an enlarged fragmental view showing the manner in which the arc changes as the torch moves in welding relationship with successive insulated risers.

The welding of a circumferential weld bead now proceeds. The welding arc burns continuously but bridges the insulating segments 17 as shown in FIG. 3. In this view 53a through 53f depict successive positions of the electrode 53 in the direction of the arrow. The arc terminates at leading riser 11a for positions 53a, 53b and 53c stretching as the electrode recedes from riser 11a. At 53d near the center of the insulator 17 the arc transfers to following riser 11b and then remains on 11b at position 53d and 53e until transferred to a succeeding riser. The arc has physical width and its transfer from 11a to 11b is continuous.

Transducer 101 causes its counter to count 360° of revolution after the start of the welding. At this point the clutch (not shown) between motor 43 and carriage 41 is actuated and the electrode 53 is fed radially outwardly for a distance determined by a number of pulses from 103. Typically transducer 103 generates one count per .001 inch radial travel; for 140 inches the counter 103 would deliver 140 successive counting pulses. The pulses from 103 are fed both to the summing counter and the counter connected to transducer 103. The pulses from transducer 103 are at a substantially higher rate than those from transducer 101. The outfeed of electrode 53 takes place during the 140 counts from transducer 103. When these counts are completed the electrode 53 is set for another overlapping circumferential weld bead and the counter on transducer 103 is reset to zero. Shortly thereafter the pulser 101 has completed counting 370° (typically) from the start of the welding. The pulser connected to 101 is now reset to zero and a new weld is started.

The sequence of operation is shown in the following table:

| Successive time intervals | Pulser 101 | Feed | Pulser 103 | Feed | Summing counter |
|---|---|---|---|---|---|
| 1 | 000 | | 000 | | |
| 2 | 360 | Circumferential | 000 | | |
| 3 | | | 140 | Radial | 140 |
| 4 | 370 | Circumferential | 000 | | |
| 5 | 000 | | 000 | | |
| 6 | 360 | Circumferential | 000 | | 140 |
| 7 | | | 140 | Radial | 280 |
| 8 | 370 | Circumferential | 000 | | 280 |
| 9 | 000 | | 000 | | ¹ 280 |

¹ Total radial feed.

This operation continues until there are a preset number of counts corresponding to the width of the annulus of lead-riser arrays. Typically that transverse travel would stop at 1.180 counts in the summing counter; that is 1.180 inches rradial travel. Then the complete apparatus is deenergized.

In a typical situation the welding current is between 230 and 240 amperes DC and the arc voltage is between 18 and 20½ volts. The starting arc gap is between .032 and .034 inch and the starting rate of welding is about 20 inches per minute at the smallest diameter of the commutator and increases as the diameter increases. The reactor I is 2.1 millihenries at 60 cycles per second. Typical gas flow for helium is about 30 to 35 cubic feet per hour. Typically the tungsten electrode 53 has a diameter of 3/32 inch and the gas is fed through a 1/8 inch diameter cup with the electrode 53 at its center. This produces an envelope of high velocity shielding gas to sweep out the gases from the insulator 17. This gas is produced by slight burning of the bonding material of the insulator 17.

Figure 7:
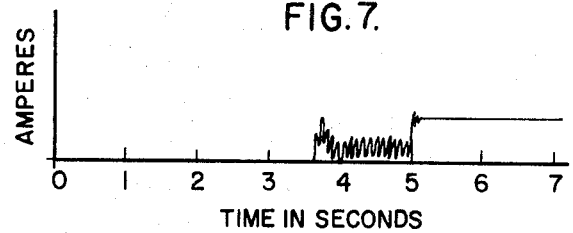
FIG. 7 is a copy of an oscillogram of the welding current taken during an actual welding operation with the recorder tape moving relative to the pen of the recorder at the rate of 25 millimeters per second.
Figure 8:
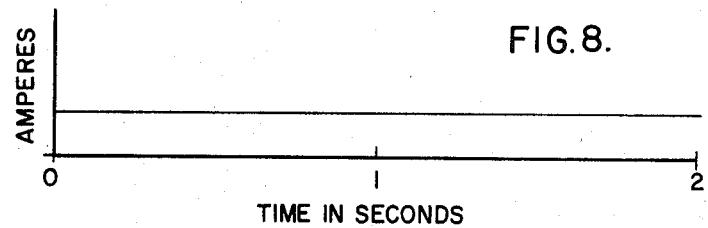
FIG. 8 is a copy similar to FIG. 7 but with the recorder tape moving relative to the pen of the recorder at the rate of 125 millimeters per second.

The oscillograms in FIGS. 7 and 8 were taken on a Mark II brush recorder with the apparatus described herein carrying out a welding operation in accordance with this invention. The vertical coordinate in FIG. 7 is welding current and the horizontal coordinate is time in seconds. The irregular lines in FIG. 7 starting about 3.6 seconds after the start of the recorder shows the high-frequency stabilizer current. This current fired the arc and it supplied welding current at about 230 amperes. FIG. 8 is an oscillogram produced with the arc for which FIG. 7 was produced while it continued to burn but, in this case, the recorder speed was increased to five times the speed for FIG. 7. FIGS. 7 and 8 show that the arc burned continuously during the welding operation.

The following summary may aid the understanding of this invention:

In accordance with the teachings of the prior art coil leads of rotating machines are joined to commutator riser by use of a radial flow solder pot to heat the joint and to feed the solder to the joint between the coil lead 15 and the riser 11. The main disadvantage of this process, is the low operating temperature of the solder which limits the operating temperature of the machine.

In the case of higher-power machines the coil lead 15 is welded to the riser 11 by indexing each riser into position and then moving a tungsten-inert-gas torch along the riser in a radial direction to weld the coil lead to the riser. After each riser 11 is welded, the next riser is indexed into position. Usually, one to two risers 11 must be skipped during each index to avoid uneven heating of the commutator 13.

The main disadvantages of the preceding welding approach are as follows:

(1) The capital equipment required for indexing and control is costly.

(2) Time is lost during indexing the commutator and the necessary restarting of the arc, for each riser.

In accordance with this invention the coil leads 15 are continuously welded to the commutator risers 11, by rotating the commutator 13 while maintaining an arc, which welds each coil lead 15 to the commutator risers 11. The procedure is as follows:

(1) The commutator 13 rotates about the centerline of the shaft 37. (The centerline of the shaft 37 may be in a vertical or horizontal position.)

(2) A tungsten inert gas torch 21 mounted on slider 41, which moves at right angles to the centerline of the shaft 37, is positioned at the inside periphery or outside periphery of the commutator riser joint.

(3) The arc is fired and the commutator 13 starts to rotate.

(4) As the arc passes over a commutator riser 11 to coil lead joint, the lead and riser are fused together. Then as the arc approaches the insulator 17 separating the risers, the arc elongates and then jumps to the next riser. (The control of mica erosion and the splashing of the copper is a function of the volt-ampere curve of the arc power supply which may be set to minimize erosion and splashing.)

(5) When slightly over one revolution is completed, the torch is moved in a radial direction as the commutator is being rotated, to fuse a new area of the joint. The distance of this move is adjusted, so that a portion of the first area is remelted, when the next circumferential weld is made.

The preceding sequence is used when the width of the fused area is small with respect to the conductor. An alternative method, when the conductor width and the width of the fused area permit, is to feed the torch continuously, so the fused area is developed as a spiral rather than a series of concentric overlapping circles.

The advantages of the invention are as follows:

(1) The equipment required is less costly than for prior art methods.

(2) The time required is reduced, since no indexing time is concerned.

(3) The heat input to the commutator 13 is distributed more evenly, permitting the use of higher currents. This increases the welding speed, which reduces the time required.

The practice of this invention can be carried out partly by hand. In this case the motor 29 rotates the commutator at an appropriate speed for producing circumferential welds and the operator rotates a handwheel to produce the radial movement as necessary. The welding may also be carried out automatically with motor 43 producing the radial motion. If during operation the arc is accidentally extinguished, the open-circuit voltage appears between terminals 66 and 68 and relay RC1 is reactuated energizing stabilizer 74 so that there is high-frequency for refiring the arc.

I claim as my invention:

1. A method of welding conductors to the risers of a commutator consisting of a cylindrical assembly of commutator bars having radially extending risers at one end of each bar with insulating strips separating the bars and risers, said method comprising placing the conductors in slots in the risers, placing a welding electrode adjacent the radial surface formed by the risers, initiating a welding arc between said electrode and said surface, relatively moving the commutator and the electrode to cause the arc to travel relative to the commutator in a continuous circular path about the axis of the commutator, and moving the electrode radially of the axis of the commutator to cause the weld to substantially cover a predetermined annular area of said radial surface.

2. The method of claim 1 in which the commutator is rotated continuously about its axis at a uniform rate of rotation during the welding operation.

3. The method of claim 2 in which the welding electrode is moved radially a predetermined distance after each complete revolution of the commutator whereby the weld is made in a series of concentric circles about the axis of the commutator.

4. The method of claim 2 in which the welding electrode is continuously moved radially during rotation of the commutator whereby the weld is made in a spiral about the axis of the commutator.

References Cited

UNITED STATES PATENTS

| | | | |
|---|---|---|---|
| 1,447,993 | 3/1923 | Libby | 219—137 |
| 2,399,377 | 4/1946 | Pakala et al. | 219—137 X |
| 2,400,902 | 5/1946 | Allen | 219—137 X |
| 2,878,405 | 3/1959 | Merril | 310—234 |

JOSEPH V. TRUHE, Primary Examiner

C. L. ALBRITTON, Assistant Examiner

U.S. Cl. X.R.

29—597